March 22, 1927. 1,622,230
G. W. POILLON
STORAGE BATTERY
Filed Feb. 19, 1925
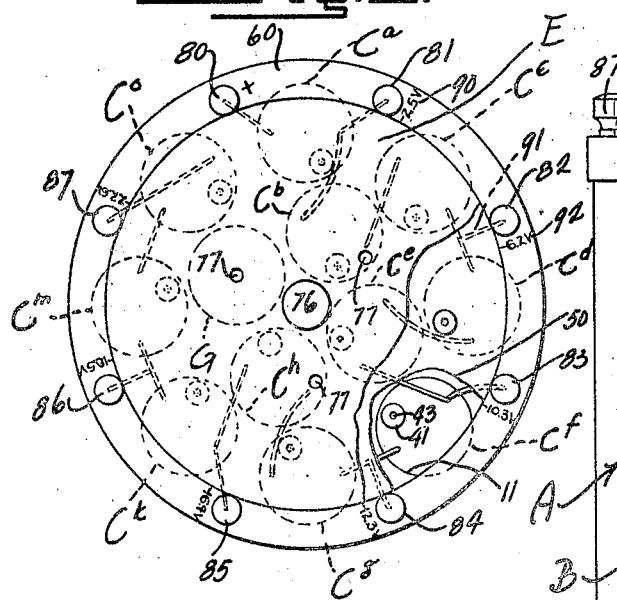
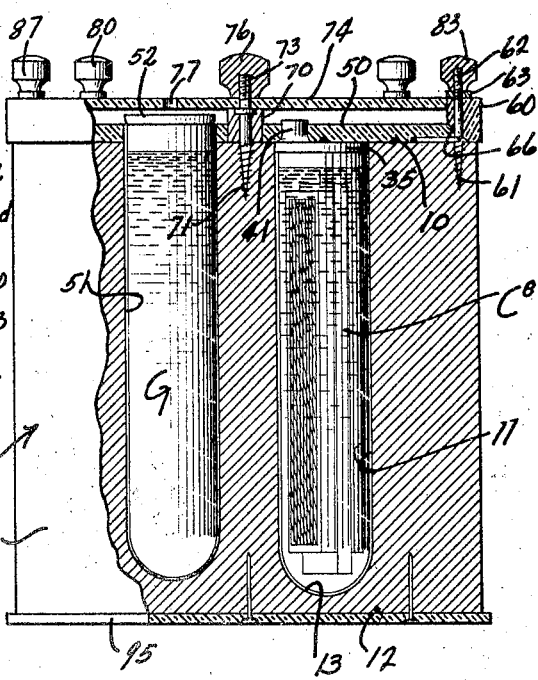
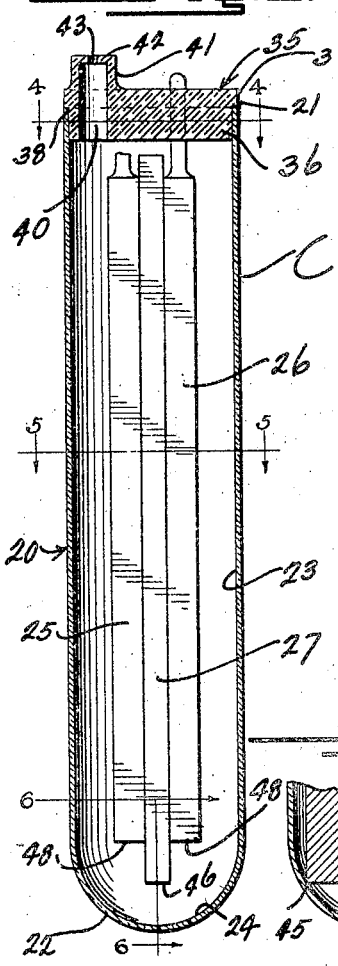
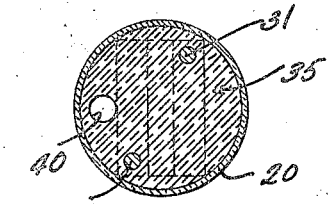
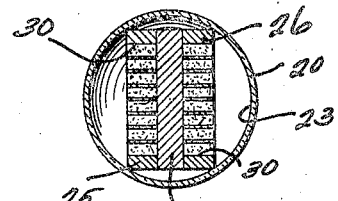
Inventor
George W. Poillon
By Lancaster and Allwine
Attorneys Patented Mar. 22, 1927.

1,622,230

UNITED STATES PATENT OFFICE.

GEORGE W. POILLON, OF TARRYTOWN, NEW YORK.

STORAGE BATTERY.

Application filed February 19, 1925. Serial No. 10,357.

This invention relates to improvements in storage battery constructions.

The primary object of this invention is the provision of a storage battery which may be used to produce a desired low, high, or intermediate voltage.

A further and important object of this invention is the provision of a storage battery embodying a plurality of cells connected in series with means by which any predetermined number of the cells may be used in a circuit to produce a current of a desired voltage.

A further object of this invention is the provision of a novel type of storage battery embodying a plurality of cells connected in series, with terminal posts connected at different intervals in the series by means of which a varied voltage of the storage battery may be used, according to the current desired for any particular purpose.

A further and important object of this invention is the provision of a novel construction in storage batteries, embodying a novel assemblage of unique cells which are relatively compact and efficiently constructed so that the same may be compactly connected in series to produce a storage battery having desired voltages.

A further object of this invention is the provision of a novel storage battery cell embodying a novel assemblage of parts.

Other objects and advantages of this invention will be apparent during the course of the following detailed description.

In the accompanying drawing, forming a part of this specification, and wherein similar reference characters designate corresponding parts throughout the several views, Figure 1 is a plan view of the improved storage battery, showing portions of the same cut away to expose internal details.

Figure 2 is a cross sectional view taken through the improved storage battery, showing more particularly the assemblage of details thereof.

Figure 3 is an enlarged cross sectional view taken through one of the cells embodied as a part of the storage battery.

Figures 4, 5 and 6 are cross sectional views taken substantially on their respective lines in Figure 3 of the drawing.

Figure 7 is a fragmentary side elevation of a plurality of the storage battery plates, showing the manner in which the same are integrally formed in series and then separated, whereby to facilitate the manufacture and reduce the cost thereof.

In the drawing, wherein for the purpose of illustration is shown only a preferred embodiment of the improved storage battery, the letter A may generally designate the same, which may include a casing B; plurality of cells C; means D connecting the cells in the casing B in a novel relation; and a closure construction E.

The casing B is preferably constructed of wood. It is preferably cylindrical in form, although the same may have any other form desired. Inwardly of the top surface 10 of this casing B, a plurality of cylindrical shaped pockets 11 are bored, or otherwise provided, which terminate short of the bottom surface 12 of the casing B, and at their lower ends said pockets 11 are convexly arcuated, as at 13.

Referring specifically to the type of cell C, each one of the same includes a glass or analogous receptacle portion 20, which is hollow-cylindrical in formation, of uniform diameter from its top edge 21 to adjacent the convexly arcuate bottom 22; the same providing an electrolyte receiving compartment 23 therein. The bottom portion 22 of the cell provides an inner concave surface 24 which will be subsequently mentioned in connection with the support of the plate and separator therein.

Each cell C preferably includes a positive plate 25, and a negative plate 26; said plates being separated by means of a wood or analogous insulating separator 27. The plates 25 and 26 are analogous in formation, each including a substantially rectangular shaped grid frame 29, providing the grid opening or openings 30 therein for receiving the active material of the plate. At the upper end of each grid frame 29 the same has an integral and bendable connecting portion 31. As a feature of the economic production of the cells C, it is to be noted from Figure 7 of the drawing that a large number of the grids or frames 29 are cast integral, in the same plane, connected at their edges on lines dotted and indicated as at 31ª, in Figure 7 of the drawing, and along which dotted lines said grids or frames are to be severed. In this form the grids may be economically cast or manufactured, and easily separated, doing away with a large number of expensive operations.

Each cell C has a soft rubber cap or stopper 35, the essential feature of which is that the same is yieldable to function as hereinafter mentioned, and to this end the same may be made of materials other than rubber. It is formed to provide a lower portion 36 which is of a diameter adapted to fit inwardly of the upper open end of the receptacle 20, and includes an upper portion 37 of a diameter larger than the diameter of the lower portion 36; the diameter of the upper portion 37 preferably being the same as the external diameter of the receptacle 20. With this construction the juncture of the portions 36 and 37 provides an annular shoulder 38 which rests upon the top edge 21 of the receptacle 20 when the cap or stopper is in place. An essential feature of each cap 35 is that the same provides a vent way 40 therethrough, eccentric of the said cap; this way 40 extending upwardly into an upwardly projecting neck 41 or nipple; the way 40 being restricted at the top of the neck 41, by means of an annular inwardly extending flange 42 which provides a minute vent duct 43 communicating with the way 40. The neck 41 and the flange 42 are of course integral with the portions 36 and 37 of the cap 35, and it is of particular importance in connection with the construction of the cap 35, that the neck 41 and flange 42 are yieldable, to permit the dilation of the duct 43 to insert a hydrometer nozzle or a filler connection, for the purpose of inserting and extracting fluids with respect to the cell C.

The positive and negative plates 25 and 26 of each cell C are preferably suspended from the cap 35, at opposite sides of the separator 27, by having their connecting portions 31 extending upwardly through restricted ways through the said cap, with leak-proof connections; the upper ends of the portions 31 of course extending above the top surface of the cap 35, to permit the lateral bending of the same into engagement with the top surface of the said respective caps 35, as is illustrated in Figures 1, 2 and 3 of the drawing and for the purpose of providing conductor connections for the plates 25 and 26. The plates 25 and 26 extend downwardly in parallel relation in the cell chamber 23, and between each positive and negative plate of each cell a separator 27, of insulating material is placed, in close abutment with the facing sides of the said plates 25 and 26; the separator 27 being supported in the cell at its lower corner edges 45, substantially after the manner illustrated in Figure 6 of the drawing; the said separator 27 at its lower end being sufficiently wide that the lower edge 46 thereof will be spaced upwardly of the lower portion of the concave bottom surface 24, providing a sediment chamber 47, so to speak, below the edge 46, which may receive deposits which are well known to electrolytic cells, without liability of forming a short circuit between the positive and negative plates of the cell. It is to be particularly noted that the lower end of the separator 27 extends below the bottom edges 48 of the positive and negative plates, as is illustrated in Figure 3 of the drawing.

When the plates are assembled in the cell in the relation above described, it is to be particularly noted that the passageway 40 is laterally disposed with respect to the plates and the separator of the cell, so that a hydrometer may be inserted into the way 40 and into the electrolytic chamber 23, with ease, to extract or insert fluid, without liability of interference upon the part of the plates and separator.

The pockets 11 are provided in any approved number in the casing B, and are of just sufficient depth to snugly receive the cells C therein. The cap 35 plays an important part in connection with the positioning of the cell in its sockets or pockets 11, as the circumference of the portion 37 of the said cap 35 abuts in a leak-proof connection with the top of the pocket 11, as is illustrated in Figure 2 of the drawing, with the top surface of the cap 35 lying flush with the top surface of casing B. In this position the vent projections 41 extend upwardly above the top surface 10 of the casing B, and after the cells have been connected as will be subsequently described, a sealing compound 50 is poured over the top surfaces of the cells and the top 10 of the casing B.

In the arrangement of cells illustrated in Figure 1, there are preferably eleven electrolytic cells, although a twelfth pocket 51 is provided, similar to the pockets 11, adapted to receive a glass container, G, similar to the containers 20, which receives water or electrolyte therein, for replenishing the cells C. This container G is provided with a stopper 52 of any approved character, and the said container G is removable from the storage battery, since the sealing wax 50 does not cover the same, as is illustrated in Figure 2 of the drawing.

The eleven cells are connected in series, and for purpose of convenience have been designated $C^a$, $C^b$, $C^c$, $C^d$, $C^e$, $C^f$, $C^g$, $C^h$, $C^k$, $C^m$, and $C^o$. These cells are connected in series in the order named, in accordance with approved construction, by means of the bendable portions 31 of the plates 25 and 26, which are soldered to each other in conducting relation, as is illustrated in Figure 1 of the drawing.

In order that any approved number of the cells may be connected to provide a storage battery of a desired voltage, the means D has been provided, which consists of a terminal post supporting ring 60 of approved insulation material, preferably hard rubber or fiber, which is attached to the upper surface at the margin of the casing B, by means of screws 61 which extend upwardly through passageways in the said ring 60, and at their upper ends provide screw threaded shanks 62 adapted to receive ring-shaped bolts 63 which clamp against the upper surface of the ring 60 to clamp the said ring in a fixed and secure position at the margin of the casing B on the top surface thereof, preferably in slightly outwardly extending relation from the outer circumference of the casing B, as illustrated in Figure 2 of the drawing. At the lower inside corner of the ring 60, the same is beveled, as at 66, facing the top surface 10 of the casing B, into which the outer marginal portion of the sealing wax 50 flows, in order to provide a leak-proof connection with the sealing ring, and to cover the terminal connections of the cells with the screw threaded bolts or screws 61, which in reality are the terminal posts for the storage battery, as will subsequently appear.

The sealing wax 50 is flowed over the top of the battery casing B, for uniform depth only sufficient to cover the connections between the cells, and the same does not cover the upper portions of the yieldable nipples or projections 41 on the cap 35, so that the ducts 43 are open to the atmosphere above the sealing material 50, whereby electrolyte, water, or other liquid may be injected or ejected with respect to the cells.

It is preferred to provide a closure arrangement for the storage battery, which preferably consists of a spacing and supporting member 70, which is secured centrally of the casing B, in upwardly projecting relation therefrom, by means of the screw member 70, the upper portion of this member 70 extending, of course, above the top surface of the sealing material 50, and above the top surface of the stopper nipples 41. This screw member at its upper end provides a screw threaded shank 73, which is adapted to receive thereover a closure 74, of insulating material, provided with a central opening to receive said shank 73, so that the screw threaded shank 73 exteriorly projecting from the closure 74 may receive a main clamping thumb nut 76, by means of which to rigidly position the closure member 74 upon the storage battery, in the position mentioned. The closure member 74 is of sufficient diameter that the same at its outer end engages the inside periphery of the ring 60, with the top surface of the closure 74 lying flush with the top surface of the ring 60, as is illustrated in Figure 2 of the drawing. In this position the closure 74 is spaced above the sealing material 50 and the tops of the nipples 41, and it is provided with a plurality of vent openings 77 therein, through which gases may vent from the space between the closure 74 and the sealing material 50; said gases of course passing from the cells through the ducts 43, as can well be understood. The closure 74 at its marginal portions may engage the ring 60 with a leak-proof connection, if desired.

In the specific form of storage battery shown it is preferred to provide eight of the terminal posts 61, although more or less may be provided, depending upon the number of cells of the storage battery, and the arrangement in which they are to be connected in series. In order to more clearly designate the nature of the terminal connections, they have been conveniently numbered 80, 81, 82, 83, 84, 85, 86 and 87.

The terminal posts 61, upon which the nuts 80 and 81 are provided are connected by means of suitable connections to the positive and negative plates of the single cell $C^a$, so that a circuit connected or shunted across the binder nuts 80 and 81 has a current flowing therein equivalent to the voltage of the cell $C^a$, which in the instance indicated is 2½ volts, as designated by the delineation 90 on the top surface of the ring 60, and as is illustrated in Figure 1 of the drawing. In like manner the other terminal posts 61 of the storage battery are connected in any approved manner to the cell connections, and as is illustrated in Figure 1 of the drawing. The terminal post of the nut 82 is connected by a suitable conductor strip 91 to the negative post of the cell $C^c$, that a circuit connected across the terminal nuts 80 and 82 will have the combined voltage of the three cells $C^a$, $C^b$ and $C^c$ flowing therein, equivalent to approximately 6.2 volts, as may be indicated by suitable delineations 92 on the ring 60. The terminal post of the nut 83 may be likewise connected in similar manner to the negative plate of the cell $C^e$, so that a circuit connected across the terminals 80 and 83 will have five of the cells connected therein, capable of producing a voltage of 10.3 volts, as is indicated on the ring 60. The terminal post of the nut 84 is connected to the negative plate of the cell $C^f$, and a circuit connected across the terminal nuts 80 and 84 has a voltage of 12.3 volts flowing therein, as can readily be understood. The post nut 85 in like manner is connected to the negative terminal of the cell $C^h$, so that it can be seen that eight of the cells are connected between the terminals 80 and 85, for producing a voltage of 16.4 volts. The post of the nut 86 is connected to the negative terminal of the cell $C^k$, and the cells between the terminals 80 and 86 have a voltage of 15.5 volts. The last terminal post which receives the nut 87 is connected to the terminal plate of the last cell $C^o$, so that all eleven of the cells are connected between the terminal nuts 80 and 87, and the combined voltage of the storage battery cells will flow in a circuit shunted across these terminals, as can readily be understood.

The application of the improved battery A, from the foregoing description will be apparent. With it a person may utilize a desired voltage of the storage battery, for a particular purpose, and the storage battery has a general use, being flexible in nature, so that it may be used for a variety of purposes where different voltages are required. Circuits may be hooked up to one, or any number of cells may be connected in series, as is readily apparent, and the utility of the improved storage battery A will be readily apparent to anyone skilled in the art to which this invention relates. In addition to this feature, the improved storage battery embodies a novel cell construction, and includes a novel and compact assemblage of parts. The cells may be readily reached for supplying the same with water, and other features of importance have been disclosed. By providing the upper portion 37 of each cap 35, of a sufficient diameter the same engages the upper portion of its pocket 11, preventing the sealing material 50 from flowing to the glass of the receptacle.

Various changes in the shape, size, and arrangement of parts may be made to the form of invention herein shown and described, without departing from the spirit of this invention or the scope of the claims.

I claim:

1. In a storage battery the combination of a casing providing a plurality of pockets therein, cells for said pockets each including positive and negative plates and including a dilatable projection having a vent duct therein which may be expanded upon insertion of a proper instrument, said cells when inserted in their pockets having said dilatable projections extending upwardly above the top surface of said casing, sealing material upon the top of said casing covering said cells below said dilatable projections and whereby the vent ducts are extended above said sealing material, means connecting the positive and negative plates of the cells so that the latter are in series, and terminal post means for the storage battery.

2. In a storage battery the combination of a casing providing a plurality of pockets therein, cells for said pockets each including positive and negative plates and including a dilatable projection having a vent duct therein which may be expanded upon insertion of a proper instrument, said cells when inserted in their pockets having said dilatable projections extending upwardly above the top surface of said casing, sealing material upon the top of said casing covering said cells below said dilatable projections and whereby the vent ducts are extended above said sealing material, means connecting the positive and negative plates of the cells so that the latter are in series, and binder post means for the storage battery, including a series of binder posts connected at the ends of the series and at points intermediate the ends of the series whereby to utilize a desired number of the cells in series to produce a current of a desired voltage.

3. A storage battery comprising a casing, cells in the casing including dilatable nipples provided with vent ducts upwardly therein, sealing material sealing the cells in the casing with the nipples projecting above the sealing material, means connecting the cells in series, a binder post supported member connected with the casing and including a plurality of binder posts connected with said cells, and closure means carried by the casing having vent ducts therein and disposed in spaced relation above said nipples and said sealing material.

4. A storage battery comprising a casing having a plurality of pockets therein, cells connected in series disposed within said pockets, a marginal member supported upwardly by the casing and providing an opening therein, sealing material disposed in said opening over the top of said casing and said cells, each of said cells having a dilatable projection with a vent duct extending upwardly through the sealing material, binder posts carried by said member, and a closure for connection to said casing above said sealing material and cells having vent openings therein.

5. In a storage battery the combination of a casing providing a plurality of pockets therein, cells for disposition in said pockets including yieldable stoppers adapted to engage at the upper ends of said pockets in a leak-proof relation, each of said stoppers providing a vent duct therethrough, sealing material over the top of said cells and casing having the vent ducts extending therethrough to the atmosphere, a marginal member supported by the casing, means connecting said cells in series, binder posts supported by the marginal member connected with said cells in the series at the ends thereof and intermediate the ends thereof, a closure member providing vent ducts therein, and means supporting the closure member in detachable relation upon said casing above the sealing material.

6. In a storage battery the combination of a casing having a plurality of pockets opening on the top surface thereof, a plurality of cells including receptacles adapted to individually fit in said pockets, said receptacles having stoppers in the tops thereof with reduced upwardly extending projections having ducts therethrough to the cells, and a sealing composition on the top of said casing covering the stoppers of said cells with the exception of said reduced projections which extend upwardly through the sealing composition and are open to the atmosphere above said sealing composition.

7. In a storage battery the combination of a casing, a plurality of cells supported in the casing, an annular insulation ring mounted on the top of said casing, means connecting said cells in series, and a plurality of terminals connected with the last mentioned means and mounted on said annular insulation ring for connecting the cells in varying numbers to produce various voltages.

8. In a storage battery the combination of a casing having a plurality of vertically extending pockets opening on the top surface thereof, a plurality of cells adapted to individually fit in said pockets including a receptacle and a stopper in the top thereof, the latter of which at its top is adapted to lie flush with the top surface of the casing when the respective cells are in the pockets of the casing, each of said stoppers having an upwardly extending dilatable nipple with a duct therethrough, said nipples being reduced upon the stoppers, a sealing composition on the top surface of the casing covering said stoppers and upwardly through which the dilatable nipples extend to project upwardly of the top surface of said sealing composition, an annular insulating ring mounted on the top of the casing surrounding said sealing composition and projecting above the top surface of said sealing composition, a substantially central projection mounted on the casing projecting upwardly above the top surface of the sealing composition, a closure, and means detachably mounting the closure on said central projection to cover the sealing composition and the exposed tops of the dilatable nipples, in spaced relation therewith, said closure at its outer edges being in internal engagement with the internal periphery of the annular insulation ring above mentioned.

GEORGE W. POILLON.